(12) United States Patent
Porikli et al.

(10) Patent No.: US 8,958,632 B2
(45) Date of Patent: Feb. 17, 2015

(54) LEARNING DICTIONARIES WITH CLUSTERED ATOMS

(75) Inventors: Fatih Porikli, Watertown, MA (US); Nikhil Rao, Madison, WI (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 451 days.

(21) Appl. No.: 13/418,217

(22) Filed: Mar. 12, 2012

(65) Prior Publication Data

US 2013/0236090 A1 Sep. 12, 2013

(51) Int. Cl.
*G06K 9/62* (2006.01)
(52) U.S. Cl.
USPC .............................. 382/159; 382/155; 382/156
(58) Field of Classification Search
None
See application file for complete search history.

(56) References Cited

PUBLICATIONS

Mairal, J., Bach, F., Ponce, J., & Sapiro, G. (2010). Online learning for matrix factorization and sparse coding. The Journal of Machine Learning Research, 11, 19-60.*
Comaniciu, D., & Meer, P. (2002). Mean shift: A robust approach toward feature space analysis. Pattern Analysis and Machine Intelligence, IEEE Transactions on, 24(5), 603-619.*

* cited by examiner

*Primary Examiner* — Jason M Repko
*Assistant Examiner* — David Perlman
(74) *Attorney, Agent, or Firm* — Dirk Brinkman; Gene Vinokur

(57) ABSTRACT

A dictionary of atoms for coding data is learned by first selecting samples from a set of samples. Similar atoms in the dictionary are clustered, and if a cluster has multiple atoms, the atoms in that cluster are merged into a single atom. The samples can be acquired online.

15 Claims, 6 Drawing Sheets

200

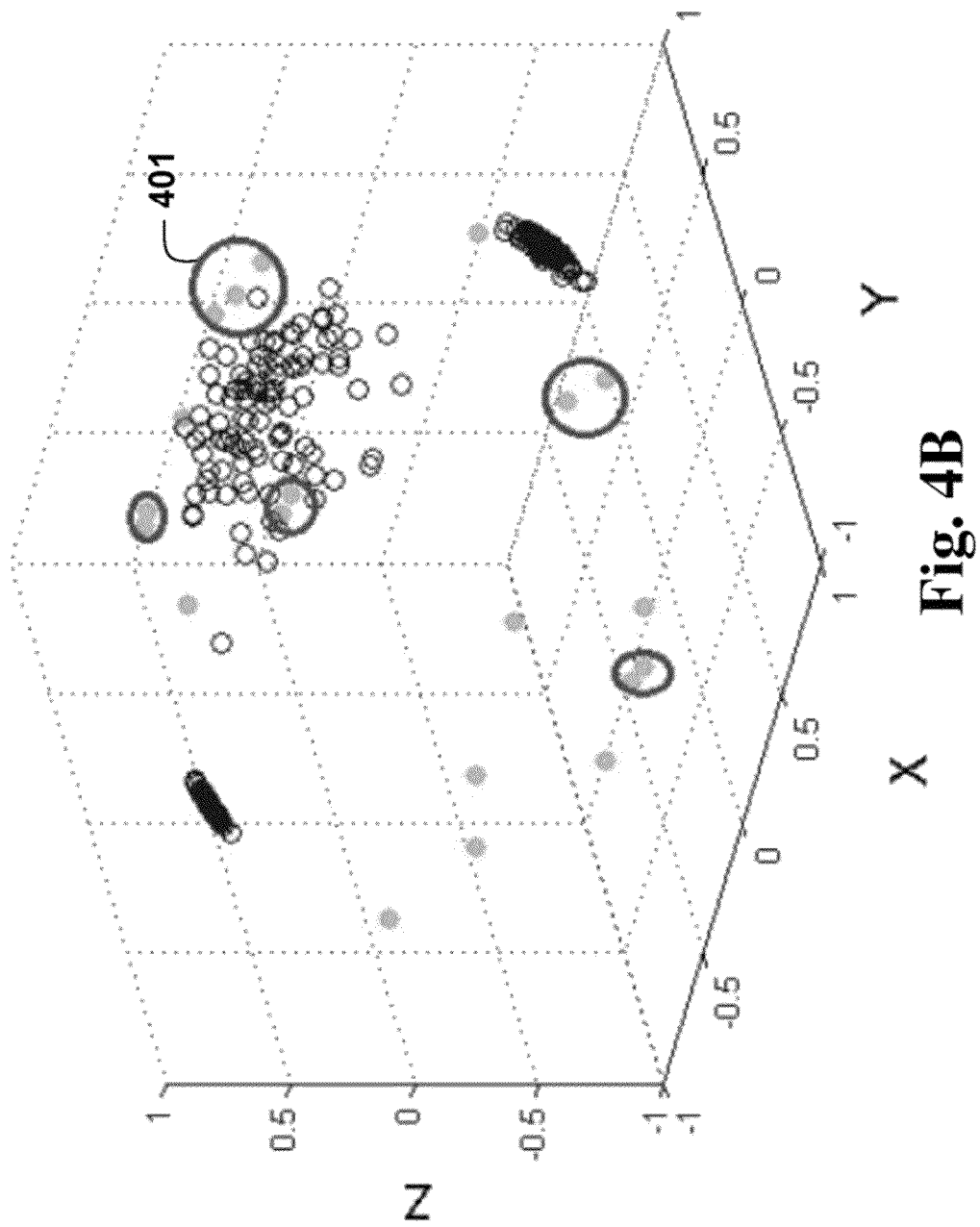

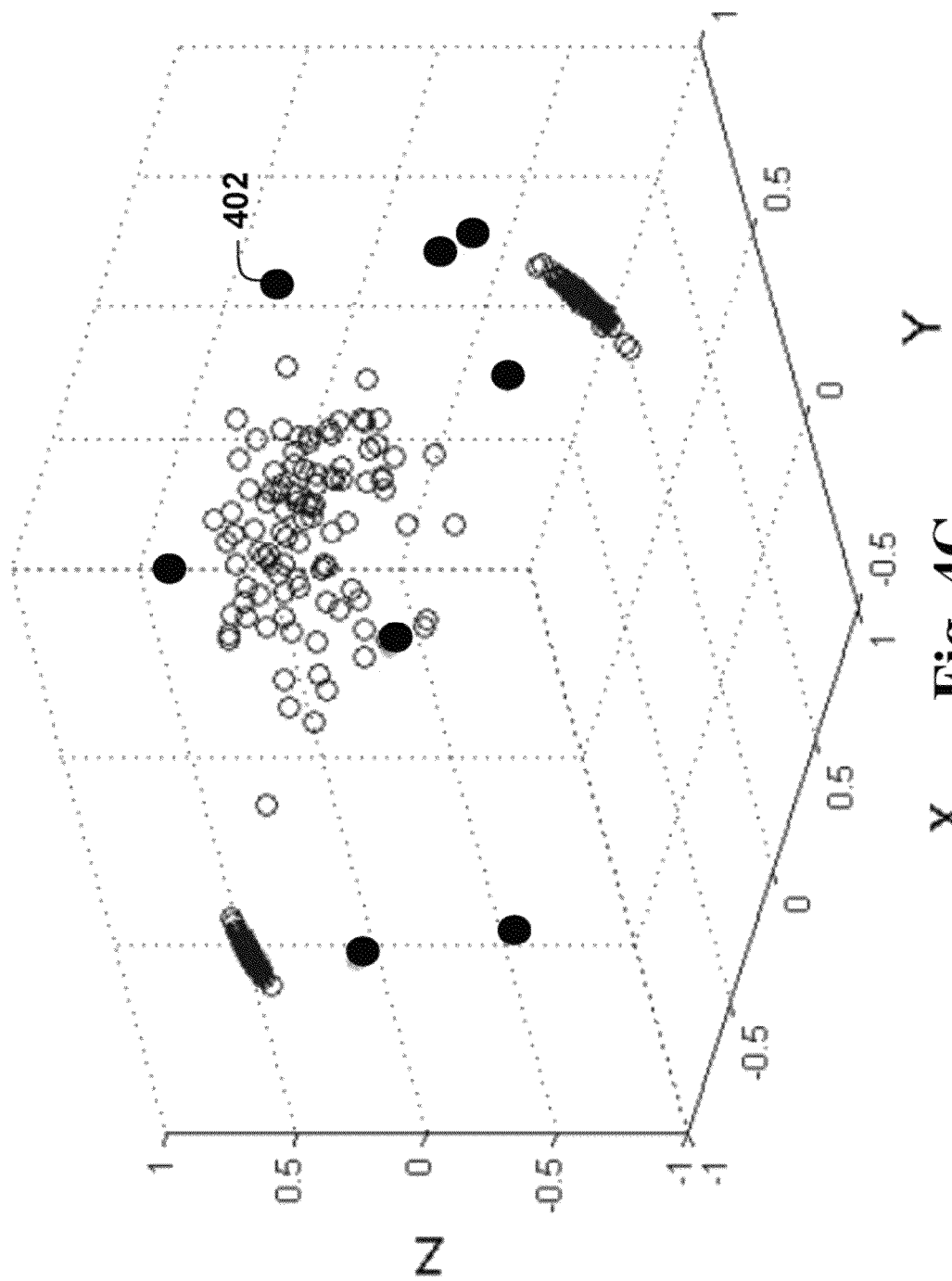

LEARNING DICTIONARIES WITH CLUSTERED ATOMS

FIELD OF THE INVENTION

This invention relates generally to learning dictionaries, and more particularly to learning the dictionaries in an online setting for coding images.

BACKGROUND OF THE INVENTION

Sparse Coding

Sparse coding represents data vectors with a sparse linear combination of atoms from a possibly overcomplete dictionary. It is a powerful tool in data representation and has shown to consistently outperform conventional vector quantization methods.

Sparse coding represents data as a sparse linear combination of some predefined atoms, which can be posed as the following optimization problem:

$$\{\hat{A}\} = \operatorname*{argmin}_{A} \frac{1}{2} \|X - BA\|_F^2 + \lambda_s \|A\|_p \quad (1.1)$$

where X is a matrix with data points as columns, B is a known, fixed and usually overcomplete set of bases, and A is the set of coefficients such that X≈BA, and F is the Frobenius norm. A regularization parameter is $\lambda_S$. The regularization term promotes sparsity in the coefficients of A, in that 0≤p≤1, with $\|A\|_p$ defined as:

$$\|A\|_p = \left(\sum_i \sum_j |A_{ij}|^p\right)^{\frac{1}{p}}.$$

When p=1, the regularization term; and subsequently the entire equation (1.1) is convex.

Note "sparsity" is a term of art in numerical analysis, and not a relative term. Conceptually, sparsity corresponds to data that are loosely coupled.

Dictionary Learning

Dictionary learning is often used in sparse coding applications because dictionary learning offers a more accurate robustness and data dependent representations when compared to conventional sparsifying dictionaries, such as discrete cosine transforms (DCT), and wavelets. Dictionary learning for sparse coding is a powerful tool in many low level image processing applications, such as denoising, inpainting, and demosaicing. Dictionary learning finds a dictionary $\hat{D}$ such that:

A dictionary $\hat{D}$ is learned such that $$\{\hat{D}, \hat{A}\} = \operatorname*{argmin}_{D,A} \frac{1}{2} \|X - DA\|_F^2 + \lambda_d \|A\|_p. \quad (1.2)$$

Dictionary learning determines a sparse set of coefficients A, while optimizing the bases in D to better represent the available data. The function to be minimized in equation (1.2) is not jointly convex in A and D, but is convex in one variable while keeping the other variable fixed. Hence, dictionary learning typically alternates between a sparse coding stage using greedy or convex methods, and a dictionary update stage.

Dictionaries to be learned for this purpose are typically overcomplete. This means that the dictionaries have a large number of columns compared to an ambient dimension. In other words, the dictionaries are usually "fat" matrices. Henceforth, when we refer to the "size" of the dictionary, we mean the number of atoms in the dictionary, or equivalently the number of columns.

Dictionary learning often has a computational complexity of $O(k^2m+km+ks^2) \approx O(k^2)$, where k is the dictionary size and m and s are the dimension of data and sparsity of the coefficients (in the sparse coding stage), respectively. A sample complexity of dictionary learning is $O(\sqrt{k})$.

The size of the dictionary has a strong impact on the speed of the method, both in terms of computational and sample complexity. However, the size of the dictionary is typically selected and fixed before learning. Thus, a tradeoff has to be made here. A larger dictionary slows the learning method, but provides a highly sparse and redundant representation of the data, and a better fit. A smaller dictionary, on the other hand, does not provide as good a fit to the data, but speeds up the learning method.

The goal is to efficiently learn a dictionary that is "optimal" in size, so that the dictionary provides a sparse representation of the data, and it is not too large to burden computational resources. Also, it is desired to learn a small dictionary that provides a very good fit to the data.

Online Dictionary Learning

This problem has been addressed in the prior art. In an enhanced K-singular value decomposition (KSVD) method, agglomerative clustering discards similar atoms and atoms that are seldom used. While "pruning" of the dictionary might be helpful in some situations, it cannot be directly applied in an online setting, where the need for computational gains is the most.

In particular, in an online setting, the method might prune elements of the dictionary, which might become more important at a later stage. This is a possibility because learning is data dependent, and one cannot make too many accurate predictions about data not yet processed in the online setting.

One method predicts the optimum dictionary size for an Orthogonal Matching Pursuit (OMP), using notions of sphere covering. There, the atoms of the dictionary are assumed to be a subset of a known set of vectors, which is not the case in the usual learning scenario. Certain restrictive conditions on the dictionary are assumed, and it is not clear if they hold in general.

Along the same lines, a dictionary of appropriate size can be learned by selecting from an existing set of potential atoms. The relationships between a reconstruction accuracy $\|X-\hat{X}\|_F^2$, and sparsity is a direct function of the dictionary size.

Some dictionary atoms that are unused and can be replaced by the data points themselves. However, this implies that there is no reduction in the size of the dictionary. The dictionary can be pruned by discarding atoms whose norms vanish. A regularizer can also be included in the objective function to construct dictionaries of a smaller size.

SUMMARY OF THE INVENTION

The embodiments of the invention provide a method for learning a dictionary of atoms, online, as test samples are acquired. The resulting dictionary can be used by a number of low level image processing applications, such as denoising and inpainting, as well as sparse coding and representation of images.

While there has been extensive work on the development of dictionary learning methods to perform the above applications, the problem of selecting an appropriate dictionary size is difficult.

The embodiments of the invention provide a clustering based method that reduces a size of the dictionary while learning the dictionary as data samples are processed. The method learns the dictionary in an online setting, by synthesizing new atoms from atoms already in the dictionary.

The method performs as well as the prior art online dictionary learning methods, in terms of representation and reconstruction of images, which achieving considerable speedup in training times. In addition, the method learns a smaller and more representative dictionary. As an added advantage, the dictionary is more incoherent, when compared with coherent prior art dictionaries.

BRIEF DESCRIPTION OF THE DRAWINGS

FIGS. 4A-4C show clustering and merging according to embodiments of the invention.

DETAILED DESCRIPTION OF THE PREFERRED EMBODIMENTS

Figure 1:
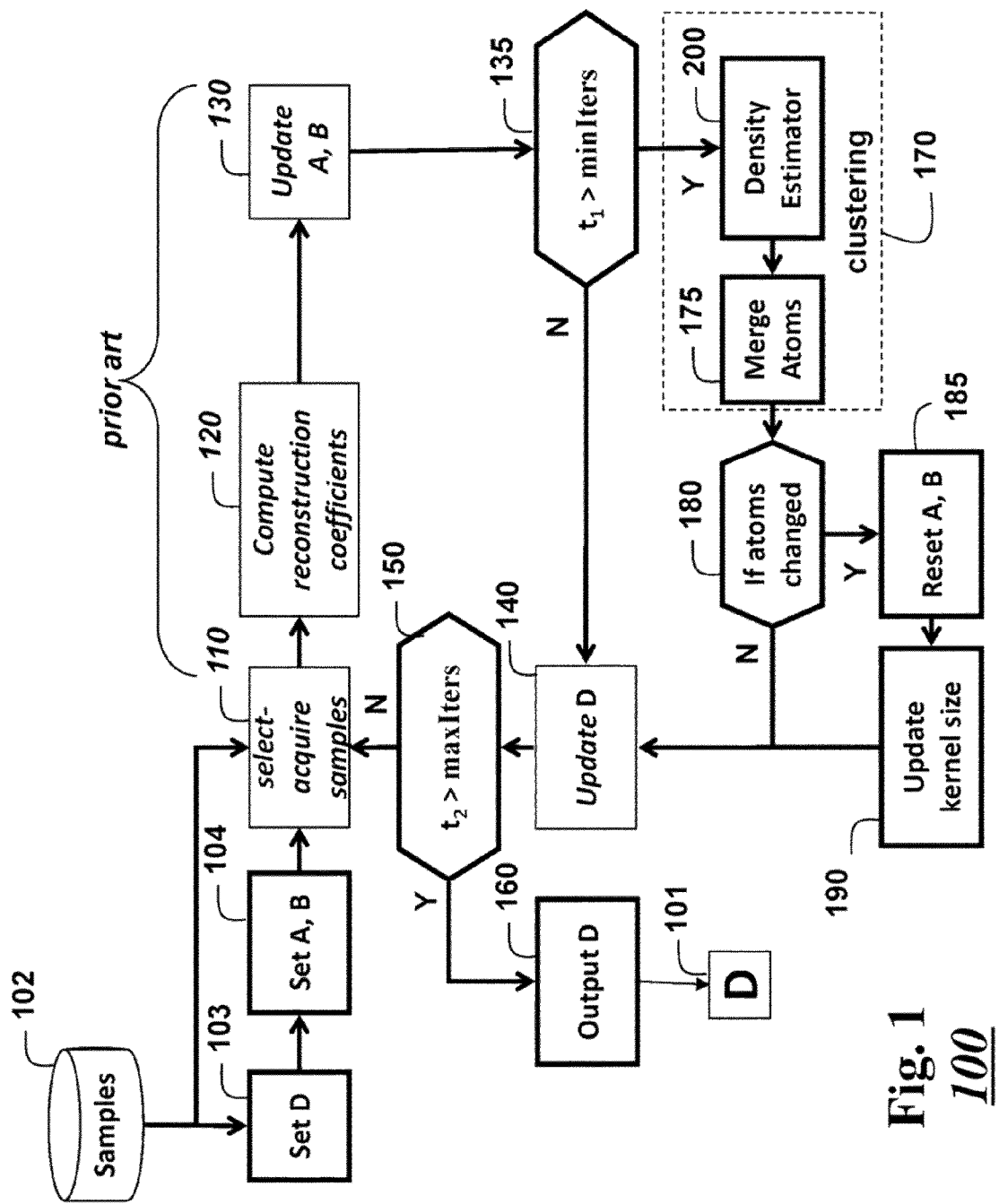
FIG. 1 is a flow diagram of a method for, and learning a dictionary online according to embodiments of the invention.

FIG. 1 shows a method 100 for learning a dictionary D 101 of atoms, online, as a set of samples 102 are acquired or processed according to embodiments of our invention. The method applies clustering and merging to atoms in the dictionary.

For comparison purposes the conventional online dictionary learning method, without clustering and merging, are shown as italics in steps 110, 120, 130, and 140 of FIG. 1.

The dictionary D, as well as "history" matrices A, B are initialized 103-104. The dictionary and matrices are described in much greater detail below.

Samples are acquired or selected 110. From the selected samples, reconstruction coefficients are computed 120, and used to update 130 matrices A and B.

The number of iterations (minIters) is compared 135 to a threshold $t_1$ to determine if the threshold is exceeded. If not, the dictionary is updated 140. During the minimum number of iterations an initial dictionary is learned from training samples.

A threshold 12 is tested 150 for a termination condition for a maximum number of iterations (maxIters), and if yes, the dictionary 101 is output 160, otherwise the next iteration proceeds at step 110.

Figure 2:
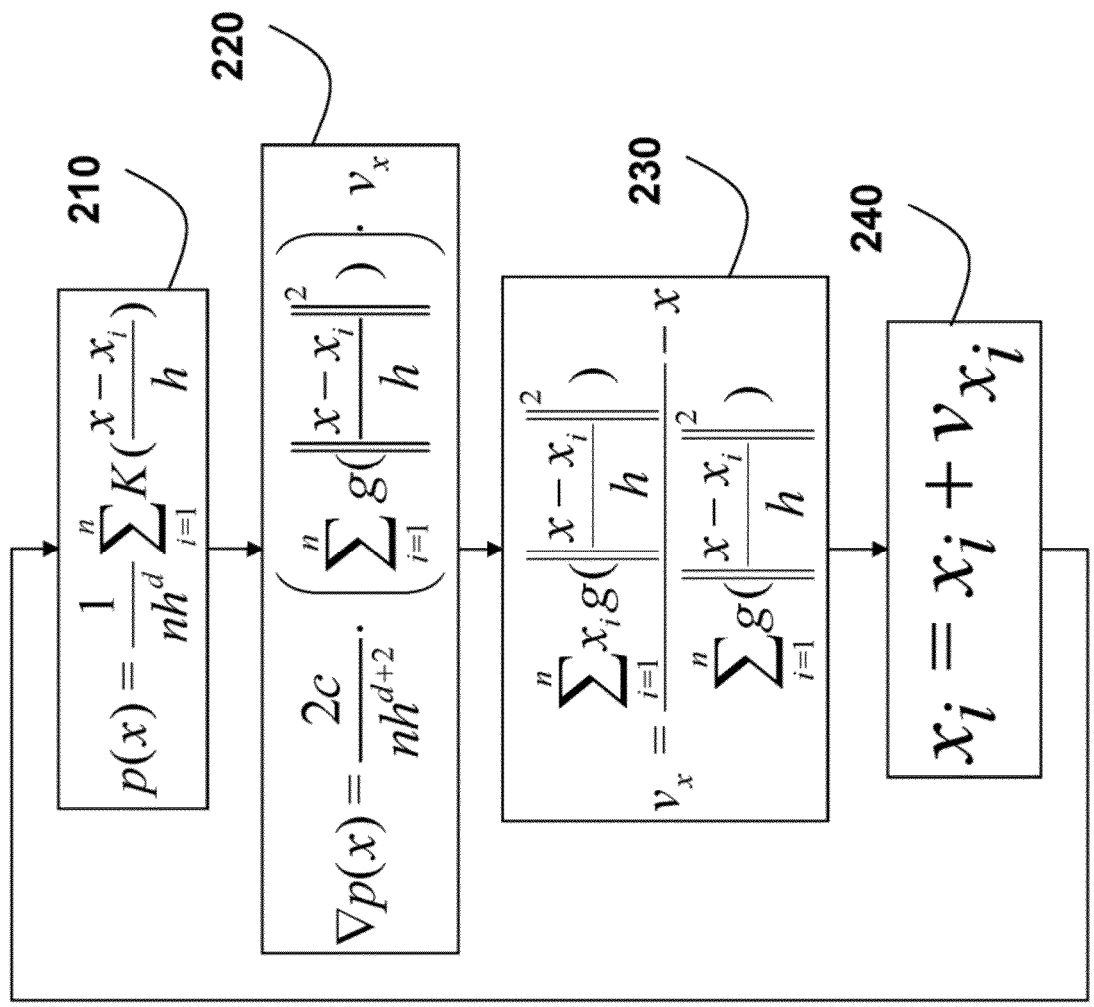
FIG. 2 is block diagram of pseudo code for a density estimator procedure according to embodiments of the invention.

If the result in step 135 is yes, then a density is estimated 200, and atoms in the dictionary are merged 175, see FIG. 2. Steps 200 and 175 in combination perform the clustering of items according to embodiments of the invention.

If 180 any atoms change, then matrices A, and B are reset 185 a kernel size is updated, and continue at step 140, otherwise go straight to step 140.

The steps, described in greater detail below, can be performed in a processor connected to memory and input/output interfaces as known in the art.

Notation

We use the following notations. We let $x_i \in R^n$ be the $i^{th}$ sample of training data $X \in R^{n \times p}$ in the samples 102. The dictionary 101 is denoted by D, where R are real numbers.

We start with an initial dictionary of size $k_0$, so that initially $D_0 \in R^{n \times k_0}$. The selected initial size is arbitrary. We use a kernel $K(\bullet)$ with an associated kernel size h for the dictionary resizing step as described below.

After resizing, the dictionary is denoted by $\overline{D}$. Wherein it is clear which dictionary is referenced, we use D to denote the resized dictionary also. Subscripted variables $x_i$, $D_i$ etc., indicate the corresponding variable at the $i^{th}$ iteration.

Superscripts $d^i$, $a^i$ indicate columns of the corresponding matrices denoted by capital letters D, A, B, etc.

As used herein, the raw data, acquired, received, or processed sequentially, are called data points x, and the data points are represented in the dictionary by atoms d.

The COLD Method

We outline our method, which employs clustering within the online dictionary learning framework.

Clustering and Merging

Clustering step applies a density estimator to determine the clusters of the atoms in the current dictionary. For each cluster that contains more than one atom, we merge the multiple atoms of a cluster into a single atom.

In other words, after the clustering determines clusters of the atoms in the dictionary using a density estimator, we apply merging to combine atoms in a cluster into a single atom when there are multiple atoms in the cluster, using for example, the mean or mode of the atoms in the cluster.

We call our method COLD, Clustering based Online Learning of Dictionaries, implying both density estimation and merging, i.e., clustering (170)=density estimator (200)+merging (175).

The Density Estimator Method

For clustering, we use a density estimator procedure 200 as shown in FIG. 2.1. The density estimator procedure offers a nonparametric way to find modes in the distribution of the dictionary atoms. This precludes the need to know the number of clusters in advance.

The procedure computes a kernel density estimate over the dictionary atoms, and assigns, to each data point, the mode of the kernel density estimate nearest in Euclidean distance to that point. The clustering is done on the empirical distribution of the dictionary atoms, and not on the data itself.

We briefly describe the density estimator based clustering method, and then outline our method, after providing an intuitive description of benefits.

The density estimator 200 method offers a non-parametric way to cluster data by associating with each data point x a corresponding mode of the kernel density estimate p(x) of the data. Specifically, given a kernel $K(\bullet)$ of size h, the d-, the d-dimensional density estimate p(x) 210 at x given n data $x_i$ is given by:

$$p(x) = \frac{1}{nh^d} \sum_{i=1}^{n} K\left(\frac{x - x_i}{h}\right),$$

where h is the kernel size of the kernel $K(\bullet)$.

Kernel defines a space of influence. For example, an n-dimensional hyper-sphere with a radius h, or a hyper-cube with 2h sides. The kernel can be data within the space of influence according to their distances from the kernel center, using e.g. a Gaussian function. The kernel determines the weight of nearby data for the density estimation. We use radially symmetric kernels, i.e. $K(z) = ck(\|z^2\|)$ where c is a constant depending on the kernel used. This leads to the gradient $\nabla p(x)$ 220 of the density estimate p(x):

$$\nabla p(x) = \frac{2c}{nh^{d+2}} \cdot \left( \sum_{i=1}^{n} g\left(\left\|\frac{x-x_i}{h}\right\|^2\right) \right) \cdot v_x \qquad (2.1)$$

where g(•) is the negative gradient $g(z)=-\nabla k(z)$ of k(•). The shift vector $v_x$ 230 at data x is $$v_x = \frac{\sum_{i=1}^{n} x_i g\left(\left\|\frac{x-x_i}{h}\right\|^2\right)}{\sum_{i=1}^{n} g\left(\left\|\frac{x-x_i}{h}\right\|^2\right)} - x. \qquad (2.2)$$

The shift vector $v_x$ always points to the direction of the maximum increase of the density estimate.

The density estimator procedure alternates between the steps: determine the density estimate 210, and its gradient 220;

compute 230 the shift vector $v_{x_i}$ for every data point $x_i$; and update 240 $x_i = x_i + v_{x_i}$.

So, by successive computation of the shift vector and the shifting of the data point along the vector, we guarantee to converge to a point where the gradient of the density is zero. Thus, the density estimator procedure is a steepest ascent over the kernel density estimate.

For each atom, we initially center the kernel on the current atom and compute the shift vector 230 in equation 2.2 using the kernel function and the atoms within the kernel window. We then translate the initial location of the kernel according to the shift vector. We repeat translating the kernel window until the translation becomes small or a maximum number of iterations is reached to reach the final location of the kernel.

For each atom, we assign the final kernel position as the mode of the corresponding atom. As a post-process, we combine nearby modes to determine a cluster center. We then assign the atoms of the combined modes to the same cluster center.

Intuition for Our Method

We provide the following intuition as to show the clustering of dictionary atoms learns smaller dictionaries, without loss in accuracy.

Consider the data X 102. For simplicity, we assume the data to lie on a unit sphere in three dimensions, and the data form three clusters. The data are assumed to be pixel intensities from an image having a background (higher variance) and two objects. Though simplistic, this allows us to clearly describe the notion of "optimal dictionary size."

We start with an initial dictionary of size $k_0$ atoms distributed randomly over the unit sphere. After training, the atoms of the dictionary align themselves according to the data. After alignment, some atoms are clustered in pairs or triplets. A smaller (but still overcomplete) dictionary prevents this.

When two or more atoms are similar (very close to each other), it is highly unlikely that more than one of the atoms is used to represent a data point simultaneously due to the sparsity constraint on the representation coefficients. In other words, when one of the atoms is selected (representation coefficient is non-zero), then, with a high likelihood, the other atoms are not. Therefore, only one atom in a cluster of atoms can be used to represent all of the data points in the cluster.

The idea is that during the learning process, whenever dictionary atoms get "too close" to each other, i.e., appear similar, we can merge these atoms.

Cold

We first give a brief overview of our dictionary learning method, followed by a detailed description. Dictionary learning involves alternating between sparse coding and dictionary update steps. Because our method operates online, we process data points sequentially, and do not know new data points in advance.

Hence, in the sparse coding step in equation (1.1), we have a single data point $x_t$ and not the matrix X, and we compute 120 the corresponding reconstruction coefficients $\alpha^t$:

$$\alpha_t = \underset{\alpha}{\operatorname{argmin}} \frac{1}{2} \|x_t - D\alpha\|^2 + \lambda \|\alpha\|_1.$$

To update the dictionary for known $\alpha_t$'s, we obtain the solution for:

$$D_t = \underset{D}{\operatorname{argmin}} \frac{1}{t} \sum_{i=1}^{t} \left[ \frac{1}{2} \|x_i - D\alpha_i\|^2 + \lambda \|\alpha_i\|_1 \right].$$

The coefficients are stored in "history" matrices A and B. Matrix A stores the sum of outer products between the sparse coefficients, while the matrix B does the same for the data points and the sparse coefficients of that point. The solution for the above equation is obtained by using columns from matrices A and B. The $j^{th}$ columns of the matrices are $a^j$ and $b^j$, respectively, and $$u^j = \frac{1}{A^{jj}} (b^j - Da^j) + d^j.$$

The dictionary atoms are then updated as:

$$d_t^j = \frac{u^j}{\|u^j\|}. \qquad (2.3)$$

We restrict the dictionary atoms to lie on the surface of the unit Euclidian sphere, and not in it. This prevents atom norms to become zero. This enables merging of the atoms at a later stage. Of course, allowing the number of atoms to reduce to zero, and discarding the atoms is another method of dictionary size reduction.

First Embodiment

Cold-I

Inputs:
$x \in R^{n^{iid}}$: p(x), $\lambda$, $D_0 \in R^{n \times k}$, maxIters, minIters, and h,
Initialize 103-104:

$A \in R^{k_0 \times k_0} \leftarrow 0, B \in R^{n \times k_0} \rightarrow D_0, t=1,:, \overline{D}_0 \leftarrow D_0$ Check 150
$t_2 \leq$ maxIters
Select 110 Draw
$x_t: p(x)$
Compute 120

$$\alpha_t = \operatorname*{argmin}_{\alpha}\left[\frac{1}{2}\|x_t - D_{t-1}\alpha\|^2 + \lambda\|\alpha\|_1\right]$$

Update 130

$$A \leftarrow A + \alpha_t\alpha_t^T$$

$$B \leftarrow B + x_t\alpha_t^T$$

Check 135
$t_1 \geq$ minIters.
Estimate 200 Density $$\overline{D_{t-1}} = \text{DensityEstinmate}(D_{t-1}, h).$$

Dictionary Changed 180

$$\overline{D_{t-1}} \neq D_{t-1}$$

Update
$A \leftarrow 0$, $B \leftarrow \overline{D_{t-1}}$ resetting past information h=h/(t−minIters+1)
Compute $D_t$ by KSVD, with $\overline{D_{t-1}}$ as warm restart t←t+1
Output 160: $D_t$ 101.

Remarks and Other Embodiments

We see that method Cold-I uses density estimator clustering. The density estimator clustering of the dictionary atoms can be done at any stage before the sparse coding, or before the dictionary update.

We do not apply the density estimator until a minimum number of iterations (minIters) 135 have passed. During the initial minimum iterations test samples are selected from the set of samples. This is because, in the online case, we need to wait until the dictionary learning procedure has adapted to a sufficient amount of data to construct the initial, before we modify the dictionary.

One can think of a maximum number of iterations do we update the dictionary until a termination condition is reached.

In a degenerated case where, after the first iteration, all the dictionary atoms are perfectly aligned, so that the density estimator procedure results in a dictionary of size 1. To prevent this, we wait for minIters iterations during dictionary training. In most cases, waiting for $k_0$ iterations where $k_0$ is the initial dictionary size, before performing the density estimator procedure is constitutes a sufficient waiting time.

After the clustering, i.e., the density estimator and the merging procedure, if the dictionary is changed and smaller, i.e., $\overline{D_t} \neq D_t$, the matrices A and B are reset 185. This is because the dictionary atoms are reduced and changed, yielding a new dictionary.

It makes sense to treat the method procedure as if restarting the learning method with the new dictionary, as an initialization. This can be seen as analogous to periodically deleting the history in the conventional online learning method. The method can be improved by not discarding history corresponding to the atoms in the dictionary that are retained, but a search requires more computations, possibly canceling the gains acquired by our clustering.

The method can be made faster by avoiding the density estimator procedure 200 at every iteration. The Method Cold-I is the simplest possible variant. We can apply the density estimator after every w iterations, which can be predetermined. That way, we only perform the density estimator (or any other clustering used) procedure after every w iteration.

Performing the density estimator after every w iterations might also be more beneficial, because it has the effect of allowing the dictionary to be trained after resizing, allowing for the atoms to reorient sufficiently according to the data.

Also, many fast versions of the density estimator procedure or a blurring procedure are known. Using those procedures considerably speeds up the density estimator procedure, and thus the overall method.

Another method to speed up is to stop the density estimator based on convergence as a termination condition. In method Cold-I, as the kernel size approaches zero and becomes very small h→0, the density estimator does not affect the dictionary, because every atom in the dictionary is a mode in the empirical distribution. Hence, continuing to perform the density estimator only adds computations. To prevent this, we can monitor the change in the dictionary after every density estimator iteration, and stop after the difference between the "new" and "old" dictionaries $\overline{D}$ and D is less than a predetermined threshold, because as h→0, $\overline{D_t}$→$D_t$.

This minimization scheme is inherently non-convex, and so convergence to a global optimum cannot be guaranteed. However, we can prove that the method converges by reducing the kernel size h sequentially as described above. As h→0 and $\overline{D}$→$D_t$, we can show that the method surely converges. It can be observed empirically that the method gives excellent results even with keeping the kernel size h constant. The reason for this is that, after the dictionary atoms are spread out due to the density estimator, the atoms are not merged. Hence, the effect is the same as that observed if h→0, i.e. $\overline{D_t} \approx D_t$.

We assign the kernel size as a function of the number of iterations h=h/(t−minIters+1). In other words, the kernel size becomes smaller with each iteration. We also use constant kernel size to obtain more smaller dictionaries.

Method Cold-II describes a faster version of COLD, using density estimator less frequently and using a faster implementation of density estimator, and also with a constant h.

Method: Fast Cold-II
Inputs:
$x \in R^{n\ iid}: p(x)$, $\lambda$, $D_0 \in R^{n \times k_0}$, maxIters, minIters, h, w
Initialize:

$$A \in R^{k_0 \times k_0} \leftarrow 0, B \in R^{m \times k_0} \leftarrow D_0, t=1, \overline{D_0} \leftarrow D_0$$

Check
$t_2 <$ maxIters
Select, Draw $x_t$: p(x)
Compute $$\alpha_t = \operatorname*{argmin}_{\alpha}\left[\frac{1}{2}\|x_t - D_{t-1}\alpha\|^2 + \lambda\|\alpha\|_1\right]$$

Update $$A \leftarrow A + \alpha_t\alpha_t^T$$

$$B \leftarrow B + x_t\alpha_t^T$$

Check
$t_1 \geq$ minIters and mod(t, w)=0
Estimate $$\overline{D_{t-1}} = \text{FastDensityEstimate}(D_{t-1}, h)$$

Dictionary Changed $$\overline{D_{t-1}} \neq D_{t-1}$$

Update $$A \leftarrow 0, B \leftarrow \overline{D_{t-1}}$$

Compute $D_t$ using KSVD, with $\overline{D_{t-1}}$ as warm restart t←t+1
Output: $D_t$
Remarks The method starts with an overcomplete initial dictionary, and subsequently decreases the number of atoms in the dictionary to result in a dictionary that has far fewer atoms than the initial dictionary.

The method replaces a cluster of atoms in the dictionary with by a newly synthesized atom. The clumping of atoms, and their subsequent clustering and merging is data dependent, as should be the case.

A question arises as to whether we can then increase the dictionary size adaptively as well, depending on the data distribution.

In some cases, the data arrives in the online setting such that the available dictionary atoms are insufficient to efficiently encode the data. The efficiency of encoding is determined according to a metric of choice. This happens if the data point in question is (nearly) orthogonal to all the atoms present in the dictionary. In such cases, we add the current data point as an atom in the dictionary to increase the dictionary, increasing its size by 1.

Analysis of the Method

This embodiment of COLD learns a more incoherent dictionary, achieves speedups in computational complexity, and is more likely to converge to a local minimum as a termination condition.

Increase in Incoherence

Incoherence of the dictionary atoms is an important characteristic of role in the theoretical guarantees of the sparse coding methods. An incoherent dictionary prevents overfitting the data, thus improving performance. By merging similar atoms into one atom, we promote incoherence among the remaining dictionary atoms. Thus, incoherency is a term of art.

Any merger of atoms after the density estimator never leads to an increase in coherence of the dictionary for the following reason.

Assume the initial coherence of the dictionary is defined as $$\mu(D) = \max_{i \neq j} | < d^i, d^j > |,$$

where $<\cdot,\cdot>$ implies the conventional Euclidean inner product. Suppose the maximum in the above definition occurs for some fixed i and j. Then, we have $$\mu(D) = | < d^i, d^j > |$$
$$= \| d^i \| \| d^j \| |\cos(\theta^{ij})|$$
$$\stackrel{(i)}{=} |\cos(\theta^{ij})|,$$

where $\theta^{ij}$ is an angle between the dictionary atoms $d^i$ and $d^j$, and (i) follows from the fact that the dictionary atoms are unit normed. Note that, the dictionary atoms are unit-length vectors in the n-dimensional space, i.e., the atoms are on the n-dimensional unit sphere, and the angle between the atoms indicate a dissimilarity between atoms, i.e., the larger the angle, the more dissimilar the atoms.

If the coherence $\mu(D)$ is large, then one of two things are implied. Either the angle is small $\theta^{ij} \approx 0$, meaning the atoms are similar close to each other, in which case atoms $d^i$ and $d^j$ are merged, or the angle $\theta^{ij} \approx \pi$, in which case the atoms are not merged. Also, the atoms are not merged if $\mu(D)$ is small, implying nearly orthogonal (or equivalently, well separated) atoms. Thus, atoms are merged only when $\theta_{ij} \approx 0$. If the coherence of the "new" dictionary is $\mu(\overline{D})$, then we have $$\mu(\overline{D}) = \max_{i \neq j} | < \overline{d}^i, \overline{d}^j > |,$$
$$\leq \max_{i \neq j} | < d^i, d^j > |,$$
$$= \mu(D),$$

where the inequality follows from the fact the merging of the dictionary atoms removes atoms that have $\theta^{ij}=0$, depending on the kernel size of h.

Figure 3:
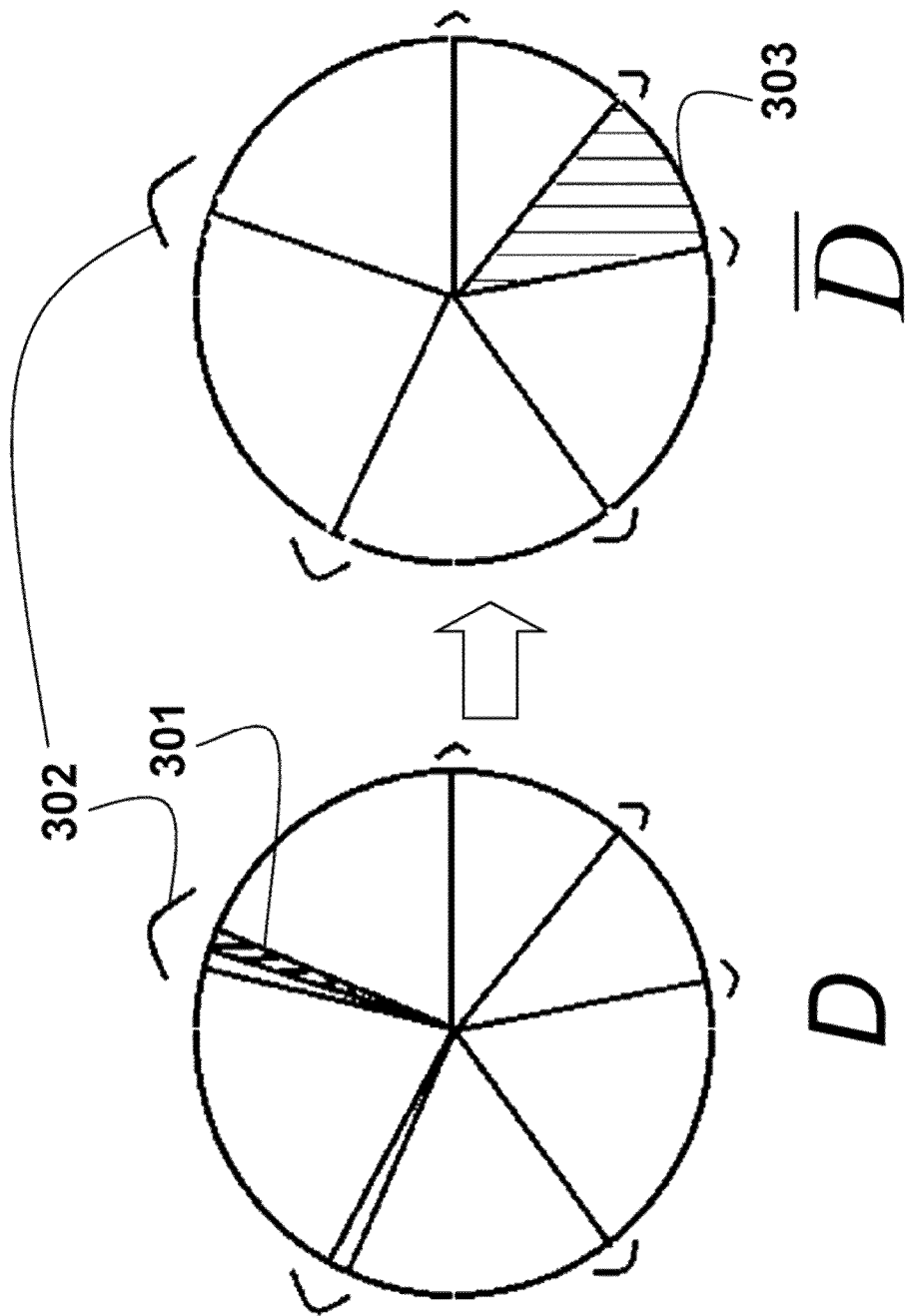
FIG. 3 is a schematic of coherence and clustering according to embodiments of the invention.

FIG. 3 shows how the coherence is reduced as nearby atoms are clustered and replaced by a single atom. For representation purposes, atoms are assumed to lie on the unit circle in two dimensions (instead of the sphere in 3D in practice). The initial dictionary D is on the unit disc.

The small shaded area 301 corresponds to the angle between the atoms, which decides the initial coherence $\mu(D)$.

The bumps 302 outside the disc correspond to the modes of the kernel density estimate over the atoms. The atoms after clustering are $\overline{D}$, and the corresponding shaded region 303 indicates the angle determining the new coherence. Clearly $\mu(\overline{D}) < \mu(D)$.

In one embodiment, we perform clustering whenever the coherence score is greater than some predetermined threshold.

Clustering and Merging

Figure 4A:
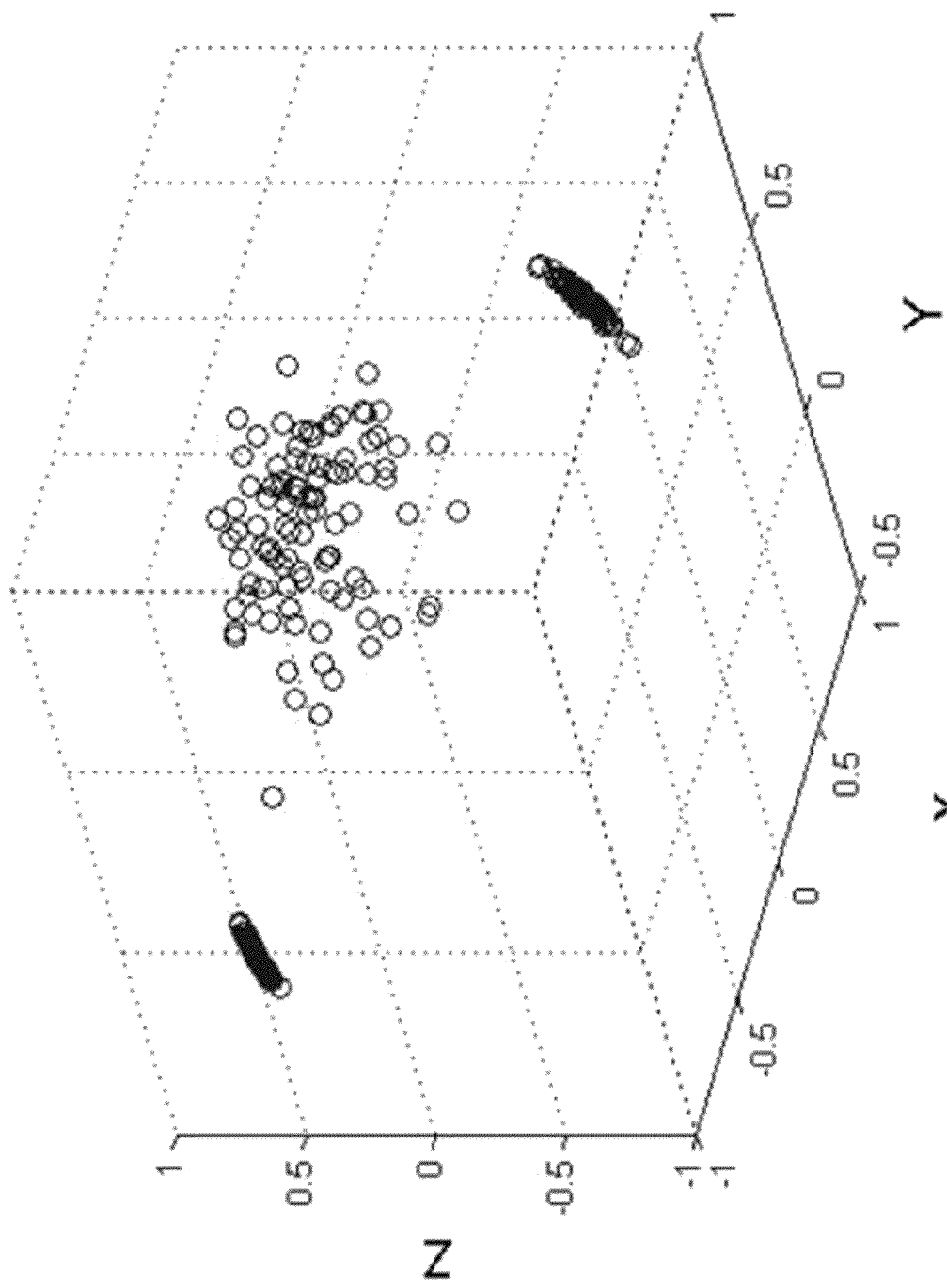

FIGS. 4A-4C shows the distribution of the data using arbitrary normalized dimensions X, Y and N, where each cluster has 100 data points, and a learned dictionary of size 20 for the data. Note how some atoms are very close (similar) to each other, depicted by circles 401 in FIG. 4B. The learned dictionary has a small number of atoms 402 farther spaced apart as shown in FIG. 4C.

In FIG. 4C, we see that a smaller but still overcomplete dictionary prevents this from happening. When two or more atoms are very close to each other, it is highly unlikely that more than one of them will be used to represent a data point simultaneously due to the sparsity constraint on the representation coefficients. In other words, when one of the atoms is selected (the representation coefficient is non-zero), then with high likelihood the others are not selected.

In FIG. 4B, only one atom per "clump" of atoms is used per data point for the representation. The idea then is that during the learning process, whenever dictionary atoms get "too close", we merge the atoms, leading to a situation more akin to that seen in FIG. 4C. Now, the atoms are further spaced apart.

Reduction in Complexity

As stated before, the dictionary learning procedure has a computational complexity of $O(k_0^2 + 2k_0) \approx O(k_0^2)$, where $k_0$ is the dictionary size, and the sample complexity of dictionary learning is $O(\sqrt{k_0})$. Smaller dictionaries automatically reduce the sample complexity.

The reduction in complexity depends on the version of density estimator clustering used. The conventional density estimator requires the computation of pairwise distances between the dictionary atoms, which for a size k dictionary is $O(k^2)$. A fast density estimator procedure significantly reduces this complexity. We consider the conventional $O(k^2)$ and show that even this achieves a reduction in complexity. So by default, faster-density estimator procedures perform much better.

Assume that the number of iterations for training, maxIters=n. In this case, n is n, not to be confused with the same variable name we used above to indicate the data size. It is natural that every density estimator does not result in a reduction of dictionary size. Suppose M of them do, so that for every $m_j$ iterations, j=0, 1, . . . M, the dictionary size reduces sequentially from $k_0$ to $k_j$. Of course, $\Sigma_{j=0}^{M} m_j = n$. Considering the density estimator itself to have a (maximum) complexity of $O(k_j^2)$, we have the total complexity of COLD to be less than conventional online dictionary learning provided that we have $$2\sum_{j=0}^{M} m_j k_j^2 \le n k_0^2. \quad (3.1)$$

This inequality strictly holds as long as $m_j$ is large and $k_j \ll k_0$ for $j \approx M$. For a highly overcomplete dictionary, this holds in general, because in the initial stages, the reduction in size of the dictionary is profound.

This can be supported by empirical validation. Another thing to note is that, equation (3.1) is the condition that is needs to be satisfied if we use the basic density estimator procedure. Faster density estimator procedures considerably reduce the complexity by making it linear in $k_j k_j$, and we can reduce equation (3.1) to $$\sum_{j=0}^{M} m_j k_j^2 \le n k_0^2, \quad (3.2)$$

corresponding to only the dictionary learning of a dictionary of size $k_j k_j$. Of course, equation (3.2) always holds, because $$k_j \le k_0 \forall j \ne 0.$$

It might be interesting to consider a case where we merge only a single pair of atoms at every stage where the density estimator procedure is applied. In this case, because the size of the dictionary decreases by merely 1 at each iteration, the condition in equation (3.1) is not satisfied, and we obtain a slower method. In other words, the gains obtained by merely discarding a single atom is negligible when opposed to the loss incurred due to performing a scheme that selects to merge only a single pair of atoms. Thus, the ability of the density estimator (or any other clustering method) to significantly reduce the dictionary size in a single pass is the key for the speed gains obtained by our method, when compared with the conventional online dictionary learning method.

Convergence

We state $$i. \; D_{t+1} - D_t = O\left(\frac{1}{t}\right) \quad \text{a.s.} \quad (3.3)$$

The dictionary after the resizing is "close" to the dictionary before resizing. Assume that, after the density estimator procedure is applied, the $j^{th}$ column (atom) of D, $d^j$ is mapped into a corresponding mode $\overline{d}^j$ of the empirical distribution over the atoms. We let $$D_t = [d^1, d^2, \ldots, d^l],$$

and $$\overline{D}_t = [\overline{d}^1, \overline{d}^2, \ldots, \overline{d}^l],$$

so that $D_t$ and $\overline{D}_t$ are of the same size. Clearly the column space of $\overline{D}_t$ is unchanged when we remove all the replicated columns corresponding to the original atoms being mapped to the same mode, leading to $\overline{D}$ as originally defined.

For a given kernel, after t iterations, if the kernel size used is h, then we have:

$$\|D_t - \overline{D}_t\|_F^2 \le k \cdot f(h), \quad (3.4)$$

where we denote by $\overline{D}$ the dictionary of the same size as D as defined above, and $f(\cdot)$ is a non-negative, non decreasing function of h.

This is true because, for every column of D $d_j$, the associated mode (after the density estimator method) is $\overline{d}_j$. Now, we have $$\|D_t - \overline{D}_t\|_F^2 \stackrel{(i)}{=} \sum_{j=1}^{k} \sum_{i=1}^{n} (D_t - \overline{D}_t)_{ij}^2$$

$$= \sum_{j=1}^{k} \|(D_t - \overline{D}_t)_j\|_2^2$$

$$\le k \cdot \max_j \|(D_t - \overline{D}_t)_j\|_2^2$$

$$\stackrel{(ii)}{\le} k \cdot f(h),$$

where in, the subscript indicates the i, $j^{th}$ element of the matrix $D_t - \overline{D}_t$, and follows from the fact that the distance between a data point and its corresponding mode in the empirical distribution to which it is mapped is a non decreasing function of the kernel size.

We can also state:

$$\|D_t - \overline{D}_t\|_F^2 = O\left(\frac{1}{t}\right),$$

because $$h = O\left(\frac{1}{t}\right).$$

Now, we can show that the density estimator produces a new dictionary that can still be used as a restart for the dictionary update step.

With the above definition of i, and a recursively shrinking kernel size, $$\|D_{t+1} - \overline{D}_t\|_F^2 = O\left(\frac{1}{t}\right). \quad (3.5)$$

From the triangle inequality, we have $$\|D_{t+1} - \overline{D}_t\|_F^2 \le \|D_{t+1} - D_t\|_F^2 + \|D_t - \overline{D}_t\|_F^2.$$

Hence, if we allow h→0, we surely achieve convergence of the learned dictionary even with the density estimator procedure. This, as described before, is because, as h approaches zero, the density estimator stops modifying the dictionary. Again, a similar situation holds with a constant h as well, but it is harder. In both cases, the key is that $\overline{D}_t \to D_t$ as t→∞.

The Offline Setting

Although we describe the online dictionary learning setting, the same method can be applied in to offline dictionary learning. To use clustering in the offline case, we simply apply the density estimator procedure after every sparse coding step in the KSVD method. We can apply the clustering procedure either before or after the dictionary update stage. Similar parallel analysis and experiments can be carried out in this scenario.

Effect of the Invention

Reduced Processing Time

Our method reduces the time required to perform online dictionary learning by using inherent clustering of dictionary atoms. The choice of the clustering method is arbitrary.

Optimal Dictionary Size

In one embodiment, we use a density estimator procedure because it is non-parametric. The reconstruction error is not affected by the reduction in the size of the dictionary. Thus, we enable an "optimum-sized" dictionary to be learned.

This is shown in the following table, comparing the prior art online dictionary learning (OLD) with our COLD method.

| Dsize | method | time(sec) | MSE(std.dev) |
|---|---|---|---|
| 50 | ODL | 11.855 | 0.00474(0.0030) |
| 41 | COLD | 17.748 | 0.00475(0.0029) |
| 100 | ODL | 20.902 | 0.00465(0.0030) |
| 40 | COLD | 18.201 | 0.00471(0.0029) |
| 150 | ODL | 34.913 | 0.00462(0.0030) |
| 50 | COLD | 23.445 | 0.00473(0.0029) |
| 200 | ODL | 49.840 | 0.00461(0.0029) |
| 45 | COLD | 24.148 | 0.00472(0.0029) |

The first column indicates the final dictionary size after learning. Note that in case of ODL, the final size=initial size. We can see that, as the initial dictionary size increases, COLD is much faster, while the loss in MSE is negligible.

Convergence

Our dictionary converges to about 2× overcomplete. This suggests that a dictionary that is 2× overcomplete generally suffices to represent detail in most images acquired of natural scenes.

Another embodiment selects the kernel size parameter, for density estimator clustering in a principled way. We can also examine a characteristic relationship between the choice of the kernel size and the reconstruction error. This combined with the characterization of the error and the sparsity parameter allows for a relationship between the trade-off between the sparsity and the kernel size, as a function of the reconstruction error desired, allowing us to optimize the parameters.

We can also increase the dictionary size while learning. One way to increase the size is to check if the dictionary at the current iteration performs adequately in the sparse coding stage, and if not, append the current data point as a new atom in the dictionary.

Our work differs from the prior art in several aspects.

Reduced Memory and Processing Time

First, we assume an online setting where a reduction in the computational time and memory requirements is most needed.

Clustering

Second, although we use clustering methods, we do not prune the dictionary by discarding atoms, but use a density based approach to synthesize new atoms from several atoms "near" to each other, i.e., similar. This offers resiliency to outliers in an online setting in the following sense.

If an atom is used rarely, then the atom is retained so long as there are not too many nearby atoms, so that the outlier data that is not represented is still be well represented by the dictionary. The loss in redundancy arising from the clustering of atoms does not affect coding accuracy.

No Assumptions

Third, we do not make restrictive assumptions on the dictionary or the data itself, except that the atoms in the dictionary lie on a unit sphere. This is a valid assumption to prevent the reconstruction coefficients from arbitrarily scaling. Also, by imposing this constraint, we ensure that the number of dictionary atoms do not reduce to zero.

Incoherency

Our method has the effect of preventing atoms of the dictionary from clumping together. This has another advantage.

Incoherent dictionaries perform better in terms of image representation than coherent (clumped) dictionaries, by preventing overfitting to the data. Incoherence of the dictionary atoms also plays a role in determining the performance of sparse coding methods. Because incoherence depends on the separation between the atoms, merging nearby dictionary atoms into a single atom improves incoherence.

We provide the following improvements:

1. We describe a new framework for iteratively reducing the dictionary in an online learning setting;

2. We show that our method allows for faster learning and that it promotes incoherence between the dictionary atoms; and 3. We show that the smaller learned dictionary performs as well as a larger, "non-shrunk" dictionary, in low level image processing applications.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for learning a dictionary, comprising the steps for:
   selecting training samples from a set of samples;
   learning a dictionary of atoms from the training samples;
   clustering similar atoms in the dictionary;
   merging, if there are multiple atoms in a particular cluster, the multiple atoms into a single atom;
   restricting the atoms to lie on surface of a unit Euclidian sphere; and
   repeating the selecting, learning, clustering and merging until a termination condition is reached, wherein the steps are performed in a processor for new samples.

2. The method of claim 1, wherein the learning is performed online as the set of samples is acquired.

3. The method of claim 1, wherein the clustering increases a sparseness of the dictionary.

4. The method of claim 1, wherein the clustering increases an incoherency of the atoms.

5. The method of claim 1, further comprising:
applying a density estimator to the atoms to form clusters.

6. The method of claim 5, wherein the density estimator depends on a mean or mode of the atoms.

7. The method of claim 5, wherein applying the density estimator further comprises:
determining a shift vector for a kernel, at an initial location, for each atom;
translating the kernel by the shift vector;
repeating the determining and translating until a termination condition is reached to obtain a final location of the kernel;
assigning the final location as the mode of the atom;
combining the nearby modes to determine a cluster center; and
assigning the atoms of the combined modes to the same cluster center.

8. The method of claim 7, further comprising:
assigning a size of the kernel as a function of a number of the iterations.

9. The method of claim 7, further comprising:
assigning a constant size to the kernel size.

10. The method of claim 1, further comprising:
determining a coherence score from the dictionary atoms; and
performing the clustering whenever the coherence score greater than a predetermine threshold.

11. The method of claim 1, wherein the termination condition is a predetermined number of iterations.

12. The method of claim 1, wherein the termination condition exists when the dictionary converges.

13. The method of claim 1, further comprising:
coding data using the dictionary.

14. A method for learning a dictionary, comprising the steps for:
selecting training samples from a set of samples;
learning a dictionary of atoms from the training samples;
clustering similar atoms in the dictionary;
merging, if there are multiple atoms in a particular cluster, the multiple atoms into a single atom;
applying a density estimator to the atoms to form clusters, wherein applying the density estimator further comprises:
determining a shift vector for a kernel, at an initial location, for each atom;
translating the kernel by the shift vector;
repeating the determining and translating until a termination condition is reached to obtain a final location of the kernel;
assigning the final location as the mode of the atom;
combining the nearby modes to determine a cluster center; and
assigning the atoms of the combined modes to the same cluster center; and
repeating the selecting, learning, clustering and merging until a termination condition is reached, wherein the steps are performed in a processor for new samples.

15. A method for learning a dictionary, comprising the steps for:
selecting training samples from a set of samples;
learning a dictionary of atoms from the training samples;
clustering similar atoms in the dictionary, comprising:
determining a coherence score from the dictionary atoms; and
performing the clustering whenever the coherence score greater than a predetermine threshold;
merging, if there are multiple atoms in a particular cluster, the multiple atoms into a single atom; and
repeating the selecting, learning, clustering and merging until a termination condition is reached, wherein the steps are performed in a processor for new samples.

* * * * *